No. 735,116. PATENTED AUG. 4, 1903.
R. KLECKNER.
NUT LOCK.
APPLICATION FILED OCT. 11, 1902.
NO MODEL.
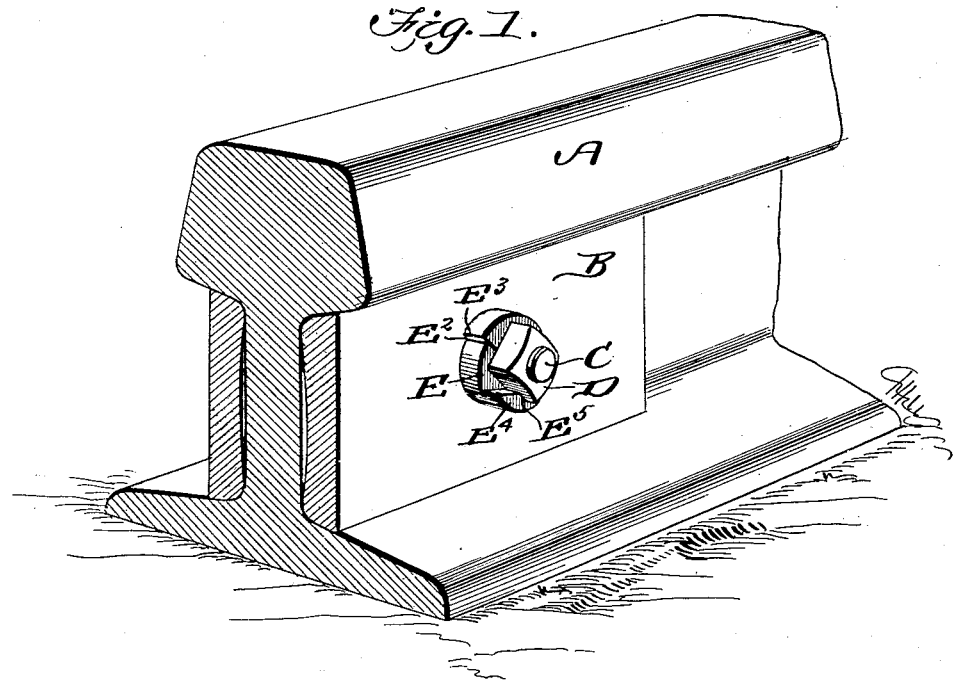
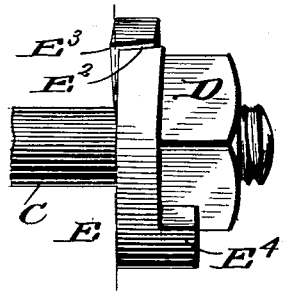
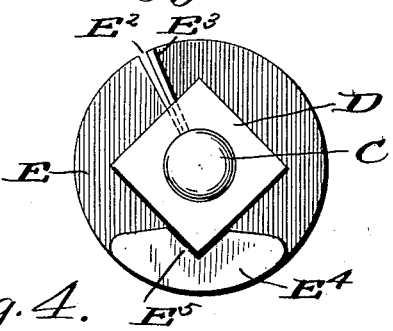
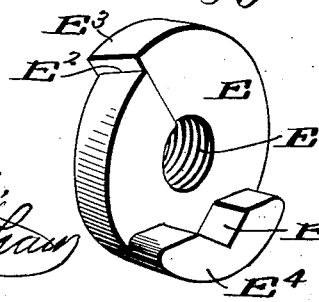

No. 735,116. Patented August 4, 1903.

UNITED STATES PATENT OFFICE.

ROBERT KLECKNER, OF HIGHBRIDGE, NEW JERSEY.

NUT-LOCK.

SPECIFICATION forming part of Letters Patent No. 735,116, dated August 4, 1903.

Application filed October 11, 1902. Serial No. 126,912. (No model.)

*To all whom it may concern:*

Be it known that I, ROBERT KLECKNER, a citizen of the United States, residing at Highbridge, in the county of Hunterdon and State of New Jersey, have invented a new and useful Improvement in Nut-Locks, of which the following is a specification.

This invention relates generally to nut-locks, the object being to provide an exceedingly cheap and simple device by means of which a nut can be securely fastened upon a bolt.

My invention is particularly adapted for the use of a railroad-rail; but it will of course be understood that it can be used any place wherever it is desired to securely fasten a nut upon a bolt; and, broadly speaking, the invention consists of a threaded washer split radially, one end being forced slightly below the opposite end and adapted to bind against the fish-plate or other solid object, said washer having a notched or recessed boss adapted to engage one edge of the nut.

The invention consists also in certain details of construction and combination, all of which will be fully described hereinafter and pointed out in the claim.

In the drawings forming a part of this specification, Figure 1 is a perspective view showing the practical application of my invention as applied to a rail. Fig. 2 is a side elevation of the threaded end of the bolt and locking device engaging therewith. Fig. 3 is a face view. Fig. 4 is a detail perspective view of the locking-washer.

Referring to the drawings, A indicates an ordinary railroad-rail, B the fish-plate, C the bolt, and D the nut, all of said parts being of the usual or any approved construction. The locking-washer E has a threaded bore E' and is split transversely from the bore to the outer margin, forming two adjacent ends $E^2$ $E^3$, and the washer being of flexible material the ends are adapted to be forced apart, one end being forced below the plane of the other. On the opposite side of the washer is formed a boss $E^4$, which is notched on its inner side at $E^5$ and is adapted to engage one edge of the nut. In use the washer and nut are placed on the bolt and the nut turned, so that one edge will fit into the notch $E^5$. When the nut has been turned into position, the ends of the washer will be forced apart and out of alinement with each other. The washer being securely held by this edge it will be impossible for the washer to turn, and so long as said washer remains stationary the nut will be held firmly in place.

While I have described the washer as having a threaded aperture, it is obvious that the said aperture may be made smooth, inasmuch as the nut and washer are always placed upon the bolt together.

Having thus fully described my invention, what I claim as new, and desire to secure by Letters Patent of the United States, is—

A nut-lock comprising a washer having a threaded bore and split transversely, one end of said washer being adapted to be forced out of alinement with the other end, and a notched boss on the side of the washer opposite the split portion, said boss being adapted to engage one edge of the nut.

ROBERT KLECKNER.

Witnesses:
ALEXANDER KLECKNER,
WM. KLECKNER.